United States Patent
Spivack et al.

(10) Patent No.: US 7,019,209 B2
(45) Date of Patent: Mar. 28, 2006

(54) STRUCTURED DYE SENSITIZED SOLAR CELL

(75) Inventors: James L. Spivack, Cobleskill, NY (US); Harish R. Acharya, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 532 days.

(21) Appl. No.: 10/316,317

(22) Filed: Dec. 11, 2002

(65) Prior Publication Data

US 2004/0112420 A1 Jun. 17, 2004

(51) Int. Cl.
*H01G 9/20* (2006.01)
*H01L 31/00* (2006.01)

(52) U.S. Cl. .................. 136/263; 136/252; 429/111
(58) Field of Classification Search ............. 136/263, 136/243–265; 429/111
See application file for complete search history.

(56) References Cited

U.S. PATENT DOCUMENTS

| | | | |
|---|---|---|---|
| 6,245,988 B1 * | 6/2001 | Gratzel et al. | 136/263 |
| 2003/0013008 A1 * | 1/2003 | Ono | 429/111 |
| 2003/0121543 A1 * | 7/2003 | Gratzel et al. | 136/252 |

* cited by examiner

Primary Examiner—Nam Nguyen
Assistant Examiner—Jeffrey T. Barton
(74) Attorney, Agent, or Firm—Fletcher Yoder

(57) ABSTRACT

A dye sensitized solar cell having a structured electrode. Specifically, a structured electrode is formed using a conductive material. The conductive material is hollowed to create a cavity therethrough. The hollowed conductive material forms a structured electrode which is coupled between two planar electrodes. Insulative layers are implemented to provide electrical separation between the structured electrode and each of the planar electrodes. A dye sensitized semiconductor material and an electrolyte solution are present in the cavity of the structured electrode to provide the presently described solar cell having a structured electrode.

57 Claims, 5 Drawing Sheets

STRUCTURED DYE SENSITIZED SOLAR CELL

CROSS-REFERENCE TO RELATED APPLICATIONS

The following commonly owned applications and patents are hereby incorporated by reference for all purposes:

U.S. patent application Ser. No. 10/316,318, filed concurrently herewith, entitled "Dye Sensitized Solar Cells Having Foil Electrodes" by James L. Spivack, John Yupeng Gui, and Reed Roeder Corderman;

U.S. patent application Ser. No. 10/316,519, filed concurrently herewith, entitled "Structured Micro-Channel Semiconductor Electrode For Photovoltaic Cells" James L. Spivack and Donald F. Foust; and U.S. patent application Ser. No. 10/316,498, filed concurrently herewith, entitled "Dye Sensitized Solar Cell Having Finger Electrodes" by James L. Spivack, Harish R. Acharya, and Donald F. Foust.

BACKGROUND OF THE INVENTION

Generally speaking, photovoltaic systems are implemented to convert light energy into electricity for a variety of applications. Power production by photovoltaic systems may offer a number of advantages over conventional systems. These advantages may include, but are not limited to, low operating costs, high reliability, modularity, low construction costs, and environmental benefits. As can be appreciated, photovoltaic systems are commonly known as "solar cells," so named for their ability to produce electricity from sunlight.

Conventional solar cells convert light into electricity by exploiting the photovoltaic effect that exists at semiconductor junctions. Accordingly, conventional solar cells generally implement semiconductor layers to produce electron current. The semiconductor layers generally absorb incoming light to produce excited electrons. In addition to the semiconductor layers, solar cells generally include a cover or other encapsulant, seals on the edges of the solar cell, a front contact electrode to allow the electrons to enter a circuit, and a back contact electrode to allow the ions created by the excitation of the electrons to complete the circuit.

One particular type of solar cell is a dye-sensitized solar cell. A dye-sensitized solar cell generally uses an organic dye to absorb incoming light to produce excited electrons. The dye sensitized solar cell generally includes two planar conducting electrodes arranged in a sandwich configuration. A dye-coated semiconductor film separates the two electrodes which may comprise glass coated with a transparent conducting oxide (TCO) film, for example. The semiconductor layer is porous and has a high surface area thereby allowing sufficient dye for efficient light absorption to be attached as a molecular monolayer on its surface. The remaining intervening space between the electrodes and the pores in the semiconductor film (which acts as a sponge) is filled with an organic electrolyte solution containing an oxidation/reduction couple such as triiodide/iodide, for example.

One exemplary technique for fabricating a dye-sensitized solar cell is to coat a conductive glass plate with a semiconductor film such as titanium oxide ($TiO_2$) or zinc oxide (ZnO), for example. The semiconductor film is saturated with a dye and a single layer of dye molecules self-assembles on each of the particles in the semiconductor film, thereby "sensitizing" the film. A liquid electrolyte solution containing triiodide/iodide is introduced into the semiconductor film. The electrolyte fills the pores and openings left in the dye-sensitized semiconductor film. To complete the solar cell, a second planar electrode with low overpotential for triiodide reduction is implemented to provide a cell structure having a dye-sensitized semiconductor and electrolyte composite sandwiched between two counter-electrodes.

Conventional dye sensitized solar cells may be fabricated using planar layered structures, as set forth above. The absorption of light by the dye excites electrons in the dye which are injected into the semiconductor film, leaving behind an oxidized dye cation. The excited electrons travel through the semiconductor film by a "random walk" through the adjacent crystals of the film towards an electrode. During the random walk of the electron to the electrode, the electron may travel a significant distance, and the electron may be lost by combining with a component of the electrolyte solution, also known as "recombination." Under irradiation by sunlight, the density of electrons in the semiconductor may be high such that such electron losses significantly reduce the maximum voltage and therefore the efficiency achievable by the solar cells. It may be advantageous to reduce the likelihood of recombination by reducing the travel path of the electron through the semiconductor and thereby reducing the length of time it takes for the electron to diffuse through the semiconductor to the conductive oxide of the electrode. One technique for reducing the travel distance of the electron is to reduce the thickness of the semiconductor film and thus, the distance the electron has to travel to reach an electrode. Disadvantageously, reduction in the thickness of the semiconductor film may reduce the light absorption in the dye, thereby reducing the efficiency of the solar cell.

Also, the injection of the electron from the dye into the semiconductor material leaves behind an oxidized dye cation. The oxidized dye is reduced by transfer of an electron from an iodide ion, leading to the production of triiodide that diffuse through the electrolyte solution to the back electrode where a catalyst supplies the missing electron thereby closing the circuit. The back electrode is generally carbonized or platinized to catalyze the electron transfer to the triiodide. The electrolyte solution is typically made in an organic solvent. Generally speaking, less volatile solvents, including ionic liquids, with a high boiling point are more viscous and impede the diffusion of ions to the point where the diffusion limits the power output and hence the efficiency of the solar cell. Such solvents may be advantageous in providing cell longevity, especially for cells fabricated on a polymer substrate, because polymer substrates may allow less viscous solvents having a low boiling point to diffuse out of the solar cell over time. Because the triiodide ion may originate from anywhere in the part of the electrolyte solution in contact with the dyed surface of the semiconductor, the ion may have to travel a long torturous path through the labyrinth created by the random pore structure of the semiconductor from near the front electrode to the back electrode to complete the circuit. These long paths may limit the diffusion current in the solar cell. Decreasing the travel distance of the ions may advantageously reduce the limitations caused by the slow diffusion of the ions. However, as previously described, reducing the thickness of the semiconductor film to reduce the ion transport path may disadvantageously reduce the light absorption of the dye.

Thus, while it may be advantageous to increase the thickness of the semiconductor film and thereby the surface area of the film to provide increased light absorption, the thicker the semiconductor film, the greater the distance the electrons and ions may have to travel to reach a respective electrode. Although longer light paths may be desirable to facilitate greater light absorption, the losses due to the increased recombination of the electrons into the semiconductor layer, as well as limits to current caused by slow ion diffusion through the electrolyte in the semiconductor pores, make the increased thickness of the semiconductor film disadvantageous since it may produce a less efficient solar cell.

BRIEF DESCRIPTION OF THE INVENTION

In accordance with one aspect of the present technique, there is provided a solar cell comprising: a first planar electrode comprising a transparent material; a second planar electrode proximately positioned at a distance from the first planar electrode; a structured electrode proximately positioned between and electrically isolated from each of the first planar electrodes and the second planar electrode, and wherein the structured electrode is configured to provide a hollow cavity; a porous dye sensitized semiconductor material positioned within the hollow cavity of the structured electrode; and an electrolyte solution positioned within the hollow cavity of the structured electrode.

In accordance with another aspect of the present technique, there is provided a solar cell comprising: a first planar electrode comprising a transparent material; a second planar electrode proximately positioned at a distance from the first planar electrode; a structured electrode proximately positioned between and electrically isolated from each of the first planar electrode and the second planar electrode, and wherein the structured electrode is configured to provide a hollow cavity defined by an inner surface of the structured electrode; a dye sensitized semiconductor material positioned within the hollow cavity of the structured electrode, wherein the dye sensitized semiconductor material is electrically isolated from each of the first planar electrode and the second planar electrode; and an electrolyte solution positioned within the hollow cavity of the structured electrode.

In accordance with a further aspect of the present technique, there is provided a solar cell comprising: a first planar electrode comprising a transparent material; a second planar electrode proximately positioned at a distance from the first planar electrode; a structured electrode proximately positioned between and electrically isolated from each of the first planar electrode and the second planar electrode, and wherein the structured electrode is configured to provide a hollow cavity defined by an inner surface of the structured electrode; a dye sensitized semiconductor material positioned within the hollow cavity of the structured electrode, wherein the dye sensitized semiconductor material is electrically coupled to each of the first planar electrode and the second planar electrode and wherein the dye sensitized semiconductor material contacts less than one quarter of the inner surface of the structured electrode; and an electrolyte solution positioned within the hollow cavity of the structured electrode.

In accordance with yet another aspect of the present technique, there is provided a method of manufacturing a solar cell comprising the acts of: providing a first planar electrode; coupling a first insulative material layer of a membrane to the first planar electrode, wherein the membrane comprises a conductive electrode material layer coupled between each of the first insulative material layer and a second insulative material layer; forming a plurality of apertures through the membrane such that a surface of the first planar electrode is exposed through each of the plurality of apertures; disposing a nanocrystalline semiconductor material into each of the plurality of apertures; saturating the surface of the nanocrystalline semiconductor material with a dye; disposing an electrolyte solution into each of the plurality of apertures; and coupling a second planar electrode to the second insulative layer of the membrane.

BRIEF DESCRIPTION OF THE DRAWINGS

Advantages and features of the invention may become apparent upon reading the following detailed description and upon reference to the drawings in which.

DETAILED DESCRIPTION OF SPECIFIC EMBODIMENTS

Figure 1:
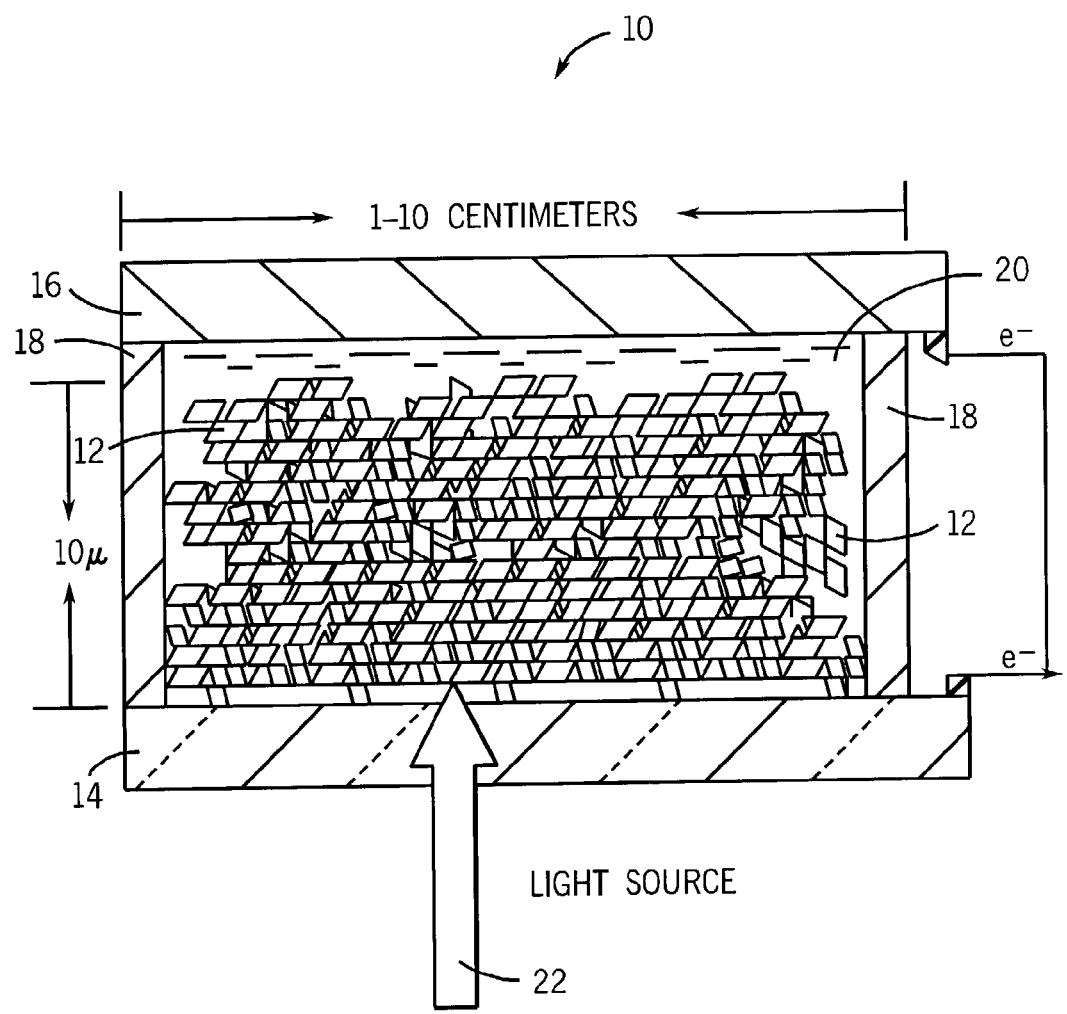
FIG. 1 illustrates a cross-sectional view of an exemplary embodiment of a dye-sensitized solar cell.

FIG. 1 illustrates an exemplary embodiment of a dye-sensitized solar cell 10. As can be appreciated, the solar cell 10 may be constructed by implementing planar layered structures. The solar cell 10 may be fabricated by implementing any one of a number of techniques and using a variety of materials, as can be appreciated by those skilled in the art. In one embodiment, a layer of semiconductor material, such as a layer of nanocrystalline titanium dioxide ($TiO_2$) 12 may be disposed on a transparent substrate 14, such as a glass substrate. The substrate 14 is coated with a conductive layer such as a transparent conducting oxide (TCO) layer. The TCO coated transparent substrate 14 forms the front electrode of the solar cell 10. As can be appreciated, the substrate 14 may comprise other transparent materials such as plastic. The $TiO_2$ layer 12 may be disposed at a thickness in the range of 5–20 microns, for example. The $TiO_2$ layer 12 is generally disposed at a thickness of at least 10 microns to facilitate efficient light absorption, as explained further below. The $TiO_2$ layer 12 of the exemplary solar cell 10 has a thickness of approximately 10 microns, as illustrated in FIG. 1. The $TiO_2$ layer 12 may be sintered or dried and pressed or chemically modified to provide mechanical strength, electrical conductivity and adherence to the substrate.

A back electrode 16 may be positioned on top of the $TiO_2$ layer 12. The back electrode 16 may be coated with a platinized TCO layer. The back electrode 16 may be positioned such that a small space (one micron, for example) is provided between the $TiO_2$ layer 12 and the back electrode 16. Accordingly, minimal contact points (or no contact points, as in the present exemplary embodiment) may exist between the $TiO_2$ layer 12 and the back electrode 16. A seal 18, such as an organic material or glass for instance, is provided to seal the edges of the solar cell 10. As can be appreciated, while the height of the solar cell 10 may be in the range of 5–20 microns, the lateral dimension of the solar cell 10 (i.e. between each of the seals 18) may be in the range of 0.5–10 centimeters, for instance. The lateral dimension of the exemplary solar cell 10 is illustrated as having an exemplary range of approximately 1–10 centimeters, for example.

The back electrode 16 may include filling holes (not shown) through which a solution of dye suitable for sensitizing the titanium oxide layer 12 can be injected. As can be appreciated by those skilled in the art, the dye used to saturate and sensitize the $TiO_2$ layer 12 may include group VIII metal complexes of bipyridine carboxylic acids, such as $Ru(4,4'\text{-dicarboxy-2,2'-bipyridyl})_2(SCN)_2$, for instance. Once the $TiO_2$ layer 12 is saturated, the dye-coated $TiO_2$ layer 12 may be rinsed and cleaned, as can be appreciated by those skilled in the art. An electrolyte layer 20 is injected through the filling holes in the back electrode 16 to fill the pores in the semiconductor film and the remaining space between the glass substrate 14 and the back electrode 16. The electrolyte layer 20 facilitates the movement of ions formed by a separation of electrons in the dye sensitized $TiO_2$ layer 12 upon exposure by an incident light source 22, such as sunlight, as explained further below. Finally, the filling holes may be sealed and electrical contact is made between the glass substrate 14 and the back electrode 16.

As illustrated with respect to FIG. 1, the light path through the sensitized $TiO_2$ layer 12 is approximately 10 microns. When an incident light source 22 is directed through the glass substrate 14, the incident light excites electrons within the dye, and the electrons are transferred into the $TiO_2$ layer 12. The electrons migrate through the adjacent crystals in the $TiO_2$ layer 12 through a "random walk." While the maximum distance of any of the particles in the $TiO_2$ layer 12 is approximately 10 microns from the glass substrate 14, the distance an electron may travel through the $TiO_2$ layer 12 to reach the glass substrate 14 may be significantly greater than 10 microns as the electron randomly migrates through adjacent nanocrystals in the $TiO_2$ layer 12. During the random walk of the electron to the glass substrate 14, the electron may be lost by combining with a component of the electrolyte layer 20. In general, the longer it takes for an electron to diffuse through the $TiO_2$ layer 12 to the underlying TCO coated substrate 14, the more likely that the electron will disadvantageously recombine. Under irradiation by sunlight the density of the electrons in the $TiO_2$ layer 12 may be high enough that the losses significantly reduce the maximum voltage and therefore the efficiency achievable by the solar cell 10. As previously discussed, reducing the thickness of the $TiO_2$ layer 12 to reduce the likelihood of electron recombination during the random walk by decreasing the migration path of the electrons is disadvantageous, because reducing the thickness of the $TiO_2$ layer 12 reduces the light absorption potential of the $TiO_2$ layer 12.

Further, ions formed by reaction of components of the electrolyte with dye molecules which have injected excited electrons into the semiconductor migrate to the back electrode 16 through the electrolyte 20 to complete the circuit. Because the $TiO_2$ layer 12 is "porous" and therefore comprises a continuous system of pores, ions in the electrolyte 20 can diffuse through the $TiO_2$ layer 12. In the present exemplary embodiment, the maximum distance from any ion to the back electrode 16 is the thickness of the $TiO_2$ layer 12 plus the additional space between the $TiO_2$ layer 12 and the back electrode 16. In the present exemplary embodiment, the maximum distance from any ion to the back electrode is approximately 11 microns. As previously described, the electrolyte layer 20 is typically an organic solvent. While polar, stable and non-viscous solvents are desirable, the solvents implemented in the solar cell 10 such as acetonitrile, are generally volatile. Generally speaking, less volatile solvents are more viscous and impede the diffusion of ions to the point where the diffusion limits the power output and therefore the efficiency of the solar cell 10. In solar cells 10 implementing a plastic substrate 14, the loss of volatile solvents may create even more of a problem.

In summary, the solar cell 10 of FIG. 1 includes a $TiO_2$ layer 12 coated with dye and disposed at a thickness of about 10 microns onto a TCO coated planar substrate 14. A platinized TCO coated glass substrate provides the back electrode 16. The $TiO_2$ layer 12 is in direct contact with the glass substrate 14 to provide an electrical connection for the excited electrons, and the contact area is advantageously maximized to provide increased electron paths through the $TiO_2$ layer 12 to the substrate 14. Conversely, the contact area between the $TiO_2$ layer 12 and the back electrode layer 16 is minimized and in the present exemplary embodiment, does not exist (i.e. the $TiO_2$ layer 12 is electrically isolated from the electrode layer 16). The shortest light path through the $TiO_2$ layer 12 is 10 microns. Although longer light paths may be desirable to provide more light absorption, the losses due to increased recombination and from ion diffusion limitations make thicker layers of the solar cell 10 less efficient.

FIGS. 2–5 illustrate improved solar cells fabricated in accordance with the present techniques. Generally speaking, the present techniques implement structured electrodes which allow the solar cell to maintain an adequate light path through the dye sensitized semiconductor layer while reducing the distances that the electrons travel through the semiconductor layer and/or by reducing the distance that the ions travel through the electrolyte. Advantageously, the present techniques reduce the recombination losses (i.e., electron losses from the semiconductor layer to a component of the electrolyte) and reduces diffusion losses in the electrolyte, thereby increasing the efficiency of the solar cell. Since the efficiency of the solar cell is a major consideration in the cost of the power produced by the cells, the techniques implementing the structured electrodes advantageously reduce the cost per watt delivered, as well.

Figure 2:
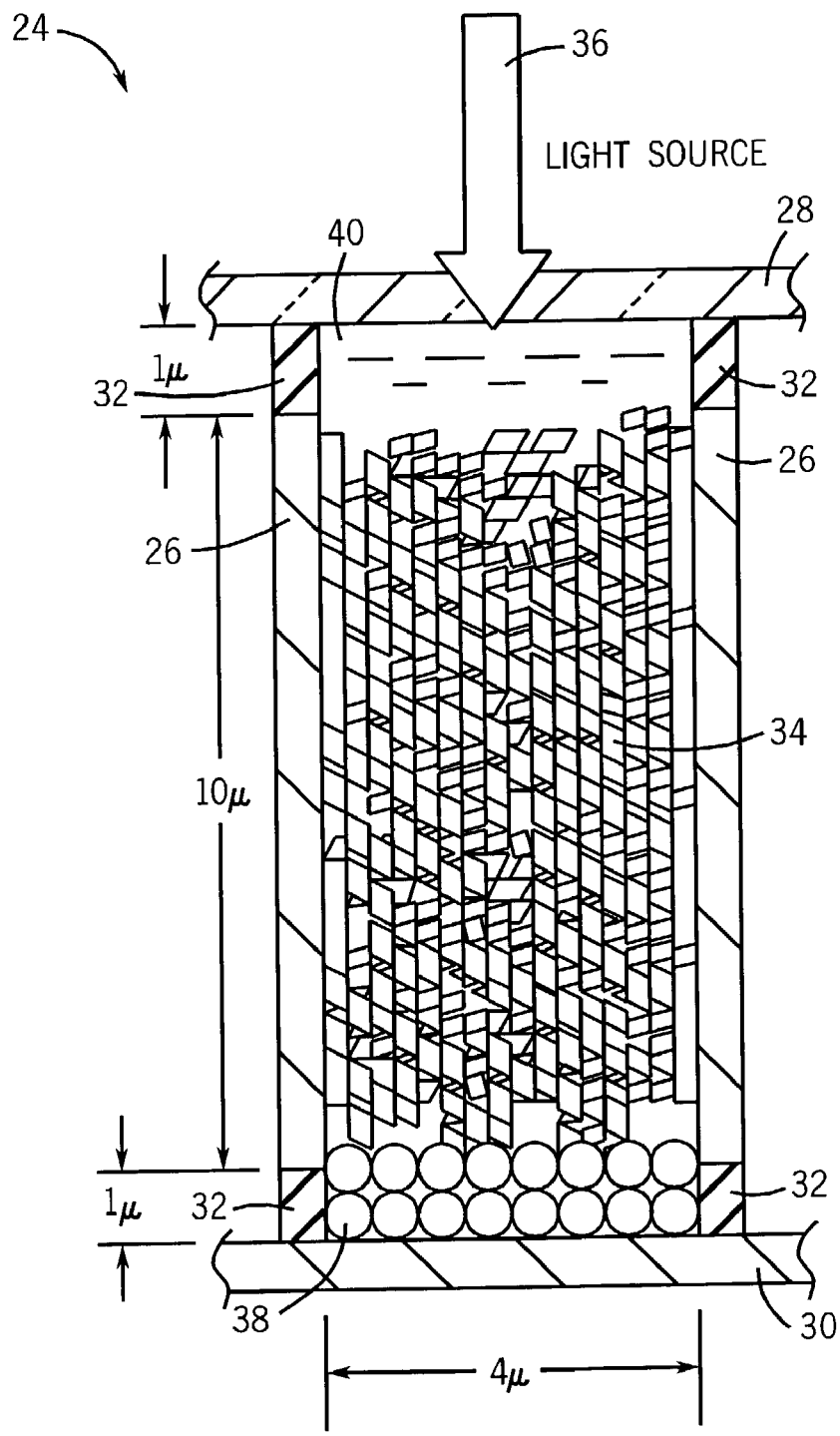
FIG. 2 illustrates a cross-sectional view of an exemplary embodiment of a dye-sensitized solar cell having a structured electrode in accordance with the present techniques.

Referring specifically to FIG. 2 a cross-sectional view of a first embodiment of a solar cell 24 implementing a structured electrode design is illustrated. For clarity, a general overview of the solar cell 24 is provided followed by a more detailed description of the solar cell 24. As used herein, "adapted to," "configured to," and the like refer to elements that are arranged or manufactured to form a specified structure or to achieve a specified result.

Generally speaking, the solar cell 24 comprises a conducting material that is configured to form one or more hollow vertical cavities or apertures therethrough, separated by thin walls of conducting material to form an array of structured electrodes. Thus, the conductive walls and hollow cavities in the conducting material are configured to form the individual solar cells of a solar cell array, as described further below. Exemplary embodiments of the structured electrode are illustrated and will be described with reference to FIGS. 5–7 below. The dye sensitized semiconductor material and electrolyte are disposed within the hollow structured electrodes. The top and bottom of the array of structured electrodes are covered with planar conducting materials that act as counter electrodes. An insulator is coupled between the structured electrodes and the planar counter electrodes. The insulating layers are conformed to the same shape and dimensions of each of the structured electrodes, as described in greater detail below. While the present exemplary embodiments illustrate structured electrodes which extend perpendicular to the surfaces of the planar electrodes, the structured electrodes may also extend in a non-perpendicular direction, such as 10 degrees from the planar electrode surface, for instance.

More specifically, FIG. 2 illustrates a cross-sectional view of an exemplary solar cell 24 having a structured electrode 26. As illustrated in the present exemplary embodiment of FIG. 2, the structured electrode 26 extends approximately 10 microns in the vertical direction. However, as can be appreciated, the structured electrode 26 may have a vertical thickness in the range of approximately 1–50 microns, for example. The solar cell 24 also includes a glass substrate that is coated with a TCO layer as previously described with reference to the substrate 14 of FIG. 1. The TCO coated glass substrate is platinized or carbonized to provide a catalyst for the triiodide ions produced from the reduction oxidation of the dye ions. The platinized substrate forms the planar electrode 28 for the solar cell 24. The solar cell 24 also includes a second planar electrode 30. The planar electrode 30 may comprise a platinized metal or TCO layer on glass, for example, thereby providing an alternate destination for the triiodide ions to acquire an electron. Insulators 32 provide electrical barriers between the structured electrode 26 and each of the planar electrodes 28 and 30.

In the present embodiment, the dye-coated semiconductor layer, here the dye-coated $TiO_2$ layer 34 fills the hollow cavity of the structured electrode 26 such that the dye-coated $TiO_2$ layer 34 is in direct electrical and physical contact with the structured electrode 26. Because the structured electrode 26 is implemented to accept the electrons separated from the dye sensitized $TiO_2$ layer 34 during exposure to a light source 36, contact between the dye-coated $TiO_2$ layer 34 and the structured electrode 26 is maximized, as illustrated in FIG. 2. Conversely, contact between the dye-coated $TiO_2$ layer 34 and each of the planar electrodes 28 and 30 is minimized. In the present exemplary embodiment, the $TiO_2$ layer 34 is completely isolated from the planar electrode 30. A porous insulator or inert beads 38 may be disposed at the bottom of the hollow solar cell 24 to prevent access of the $TiO_2$ particles to the planar electrode 30.

One exemplary technique for fabricating the solar cell 24 illustrated in FIG. 2 is to dispose a three layer membrane comprising a conductive material layer sandwiched between two insulator layers onto the planar electrode 30. In the present exemplary embodiment, the conductive material has a thickness of approximately 10 microns. The conductive material may comprise a metal or any other suitable conducting material that is resistant to corrosion by the electrolyte. The conductive material layer will be hollowed to provide a plurality of cavities or apertures to form a plurality of structured electrodes 26. Further, each of the insulator layers may have a thickness in the range of approximately 0.5–2.0 microns, for example. In the present exemplary embodiment, each insulator layer has a thickness of approximately 1 micron. The insulator layers will also be hollowed to create the structured insulators 32 of FIG. 2. The cavities may be formed by laser drilling or photolithography, for example. Exemplary embodiments of the structured electrode 26 formed from the conductive material layer will be illustrated and further discussed below with reference to FIGS. 5–7.

The diameter of the cavity of each solar cell 24 is in the range of approximately 1–10 microns. The present exemplary embodiment illustrates a solar cell 24 having a cavity with a diameter of approximately 4 microns, as illustrated in FIG. 2. The thickness of the walls of each structured electrode 26 may be in the range of 0.25–1.0 microns, for example. As previously described, the vertical height or thickness of the structured electrode 26 may be in the range of approximately 1–50 microns, for example. The structured electrode 26, illustrated in FIG. 2, has a vertical thickness of approximately 10 microns, as previously described.

Continuing with the exemplary technique for fabricating the solar cell 24, once the three layer membrane is hollowed to create the structured electrode 26 and the structured insulator 32, a thin layer of a porous insulator or inert beads 38, such as glass beads, may be disposed in the bottom of the cavity to prevent access of the semiconductor material to the planar electrode 30. Next, a slurry of nanocrystalline semiconductor material, such as nanocrystalline titanium oxide ($TiO_2$) is disposed into the hollowed cavities of each structured electrode 26. The nanocrystalline $TiO_2$ particles may have a particle size in the range of approximately 10–400 nanometers, for example. More specifically, it may be preferable to implement a semiconductor material having a particle size in the range of approximately 10–30 nanometers. After drying and sintering the titanium oxide particles a dye is introduced to saturate the $TiO_2$ surfaces and provide the dye-coated $TiO_2$ layer 34, illustrated in FIG. 2. Next, the electrolyte solution 40, which may comprise an iodide/triiodide couple, for example, is injected into each cavity to fill the remaining space in the cavity, including the pores and voids between the nanocrystalline $TiO_2$ particles. The solar cell 24 is completed by covering the entire structure with a planar electrode 28. The present exemplary technique for fabricating the solar cell 24 is meant by way of example. As can be appreciated by those skilled in the art, other techniques for fabricating such structures may also be implemented to construct a solar cell 24 in accordance with the present techniques.

As can be appreciated, the solar cell 24 advantageously minimizes the electron path through the dye-coated $TiO_2$ layer 34. The maximum distance from any one of the $TiO_2$ particles to the structured electrode 26 is only half the diameter of the solar cell 24. In the present exemplary embodiment, the maximum distance between an excited electron injected into any $TiO_2$ particle and the closest structured electrode 26 is approximately 2 microns. Further, the maximum distance between one of the planar electrodes 28 and 30 and the furthest point in the electrolyte is approximately 5 microns plus the thickness of the insulating layer 34 between the electrodes 28 and 30. Because each of the planar electrodes 28 and 30 is platinized, the ion produced by the redox transfer will generally travel to the nearest of the planar electrodes 28 and 30 to gain an electron and complete the circuit. Thus, the present exemplary embodiment minimizes the electron travel path while also reducing the ion travel path. As previously described, reducing the electron and ion travel paths in the solar cell 24 reduces the likelihood of electron losses due to recombination and ion diffusion through the electrolyte. Advantageously, the present embodiment provides a more efficient solar cell. It should also be noted, that while the electron and ion paths are reduced by the present exemplary embodiment, the light path remains at least 10 microns to provide efficient light absorption.

Figure 3:
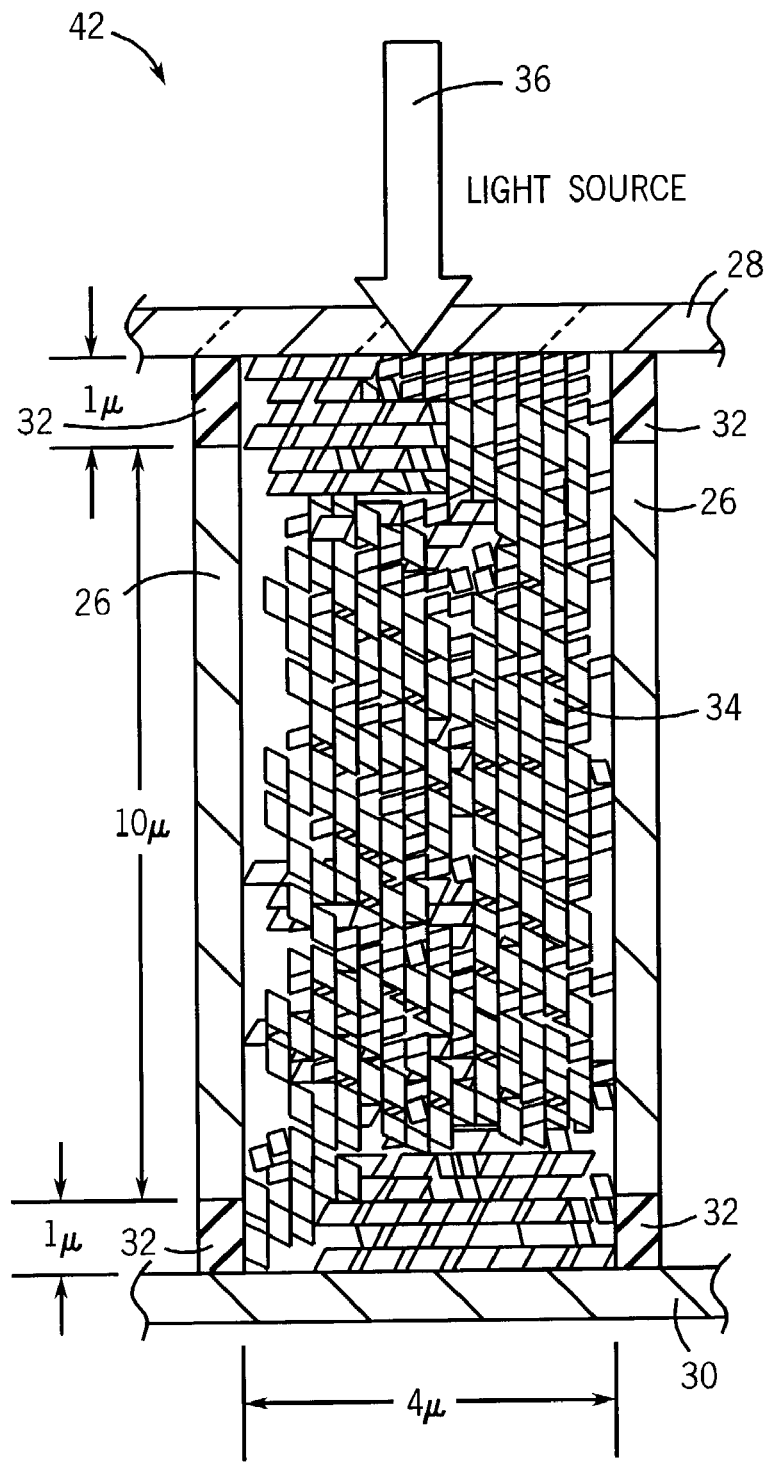
FIG. 3 illustrates a cross-sectional view of a second exemplary embodiment of a dye-sensitized solar cell having a structured electrode in accordance with the present techniques.

FIG. 3 illustrates an alternate embodiment of a solar cell having a minimum ion path and a reduced electron path. For simplicity, like reference numerals are used to describe elements previously described with reference to FIG. 2. Specifically, the solar cell 42 includes a structured electrode 26. As illustrated in FIG. 3, the structured electrode 26 extends approximately 10 microns in the vertical direction in the present exemplary embodiment. However, as can be appreciated, the structured electrode 26 may have a vertical thickness in the range of approximately 1–50 microns, for example. In the present exemplary embodiment, the structured electrode 26 provides the catalyst for the electron transfer to the ion produced during the reduction oxidation process. Accordingly, the structured electrode 26 is platinized or carbonized such that it can catalyze electron transfer to the triiodide ion.

The solar cell 42 also includes a glass substrate that is coated with a TCO layer to form a planar electrode 28, as previously described with reference to FIG. 2. However, in the solar cell 42, the planar electrode 28 is implemented for diffusion of the electrons, rather than to provide a catalyst for electron transfer to the ions. Accordingly, the TCO coated planar electrode 28 of the solar cell 42 is not platinized or carbonized. Similarly the solar cell 42 also includes a second planar electrode 30. The planar electrode 30 may comprise a metal or TCO layer on glass, for example. As with the planar electrode 28 of FIG. 3, the planar electrode 30 is not platinized or carbonized. An insulator 32 provides an electrical barrier between the structured electrode 26 and each of the planar electrodes 28 and 30.

In the present embodiment, the dye-coated semiconductor layer, here the dye-coated $TiO_2$ layer 34 fills the hollow cavity of the structured electrode 26 such that the dye-coated $TiO_2$ layer 34, is in direct electrical and physical contact with each of the planar electrodes 28 and 30. Contact between the $TiO_2$ layer 34 and the planar electrodes 28 and 30 may be desirable to provide increased connective paths for electron diffusion to the planar electrodes 28 and 30. Accordingly the porous insulator or inert beads 38 (FIG. 2) are not included in the present exemplary embodiment. Conversely, contact between the $TiO_2$ layer 34 and the structured electrode 26 is minimized, as illustrated in FIG. 3. One method of minimizing this contact would be to coat the structured electrode 26 with a thin layer of a porous insulator (not shown) before disposing the $TiO_2$. This would provide electronic insulation between the structured electrode and the $TiO_2$ layer 34 but permit ions to travel from the pores in the $TiO_2$ layer 34 to the structured electrode 26. This insulating layer could be formed or deposited electrochemically on the structured electrode 26 (without depositing the insulating layer on the planar electrode) by applying a voltage difference between the electrodes during the deposition. The diameter of the cavity of each solar cell 42 is in the range of approximately 1–10 microns. The present exemplary embodiment illustrates a solar cell 42 having a cavity with a diameter of approximately 4 microns, as illustrated in FIG. 3. The thickness of the walls of each structured electrode 26 may be in the range of 0.25–1.0 microns, for example. The vertical height or thickness of the structured electrode 26 illustrated in FIG. 3, is approximately 10 microns, as previously described.

As can be appreciated, the solar cell 42 illustrated in FIG. 3 advantageously minimizes the ion path and reduces the electron path. Specifically, the present solar cell 42 reduces the maximum electron path by about half, with respect to a standard solar cell, such as the solar cell 10 of FIG. 1, since both planar electrodes 28 and 30 may provide the destination for the electron. In the present exemplary embodiment, the maximum distance from any one of the $TiO_2$ particles (and thus, any excited electron) to the nearest planar electrode 28 and 30 is approximately 6.0 microns (i.e. half the vertical thickness of the structured electrode 26 plus the thickness of the insulator 32). The present exemplary embodiment also minimizes the ion path. The maximum distance from any point in the electrolyte 40 to the nearest point in the platinized or carbonized structured electrode 26 is approximately half the diameter of the cavity of the solar cell 42, here about 2.0 microns. Advantageously, the present embodiment provides a more efficient solar cell.

Figure 4:
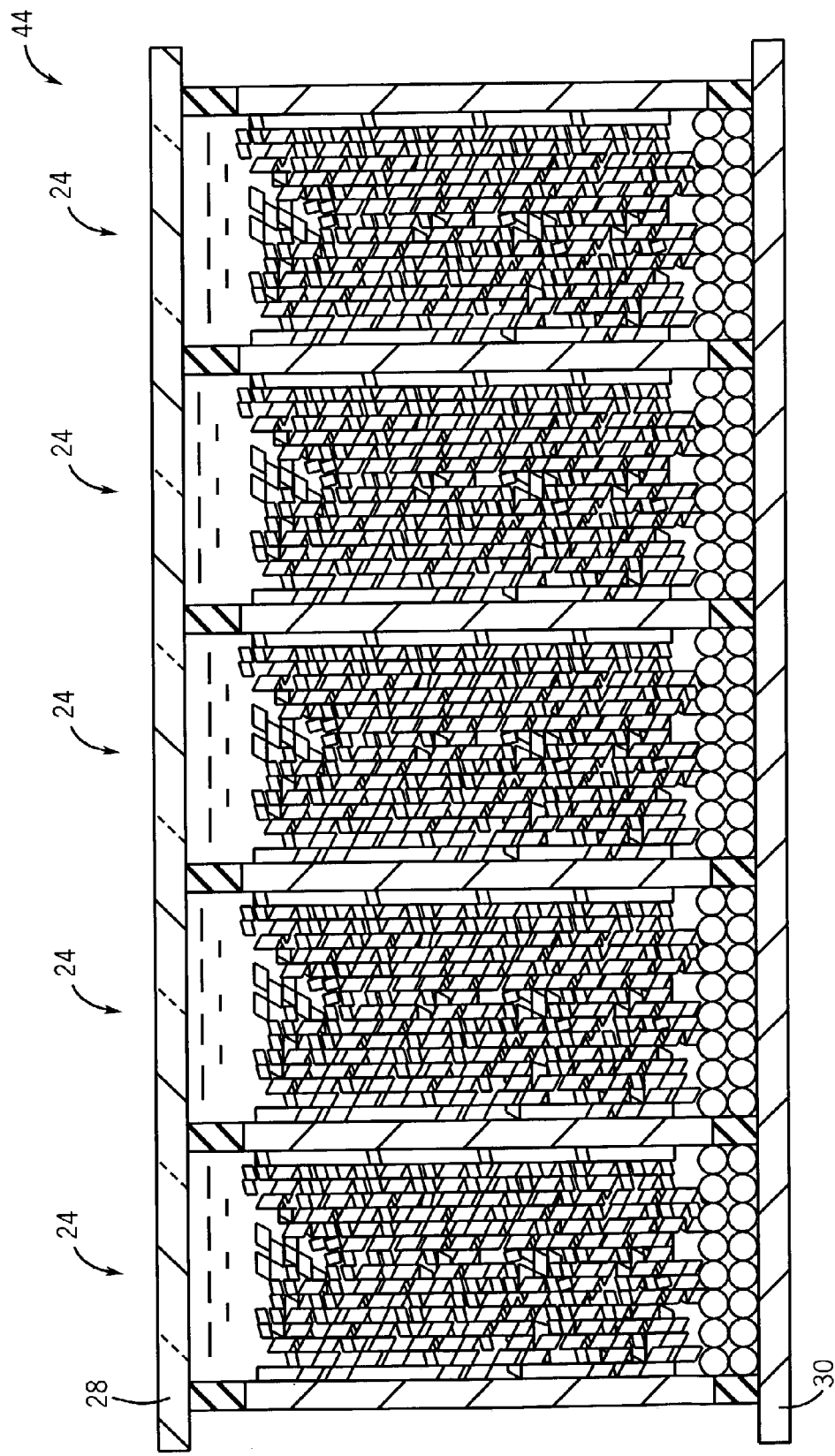
FIG. 4 illustrates a cross-sectional view of an embodiment of a solar cell array in accordance with the present techniques.

As can be appreciated, while a single solar cell structure is illustrated with reference to FIGS. 2 and 3, the solar cells are generally constructed to form an array of solar cells. A cross-sectional view of a cell array 44 constructed in accordance with the present techniques is generally illustrated in FIG. 4. The cell array 44 comprises a plurality of solar cells, such as the solar cells 24 illustrated in FIG. 2. The structured electrode 26 (FIG. 2) of each solar cell 24 may be fabricated from a single layer of material hollowed to form a plurality of cavities or apertures, as previously described. Alternately, each structured electrode 26 may be fabricated individually. As illustrated in FIG. 4, each planar electrode 28 and 30 may cover a number of solar cells 24. The solar cell array 44 may be implemented in any one of a variety of power production applications, as can be appreciated by those skilled in the art.

Figure 6:
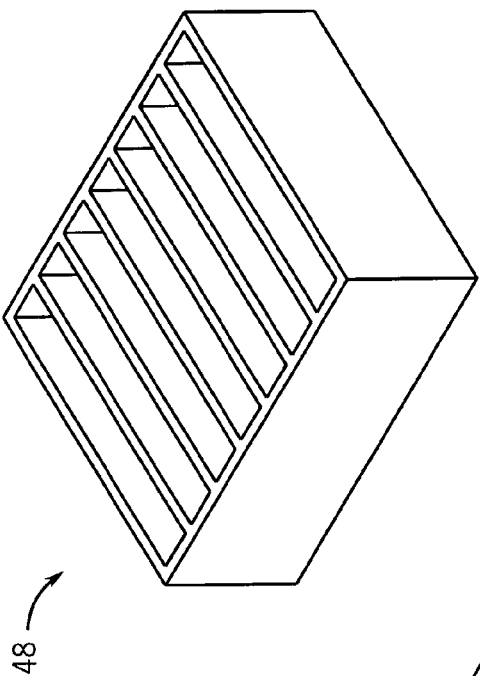
FIGS. 5–7 illustrate top plan views of exemplary embodiments of a structured electrode array in accordance with the present techniques.
Figure 7:
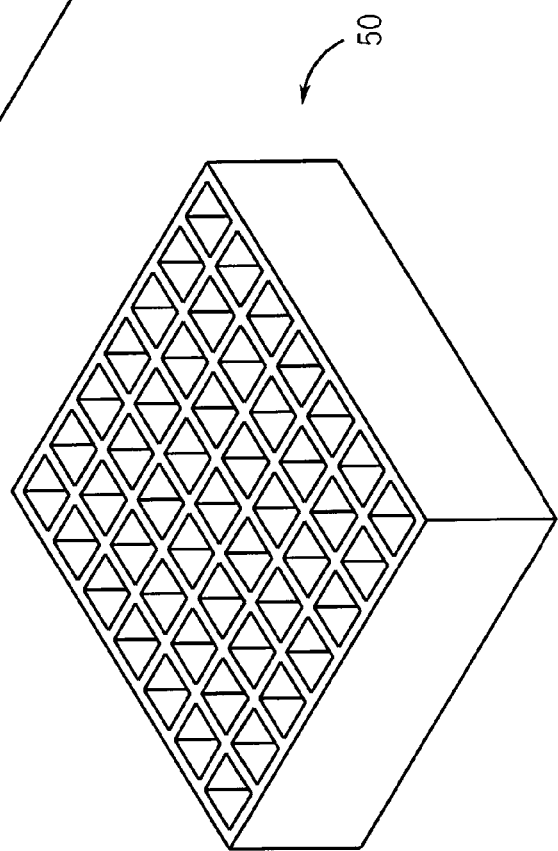
Figure 5:
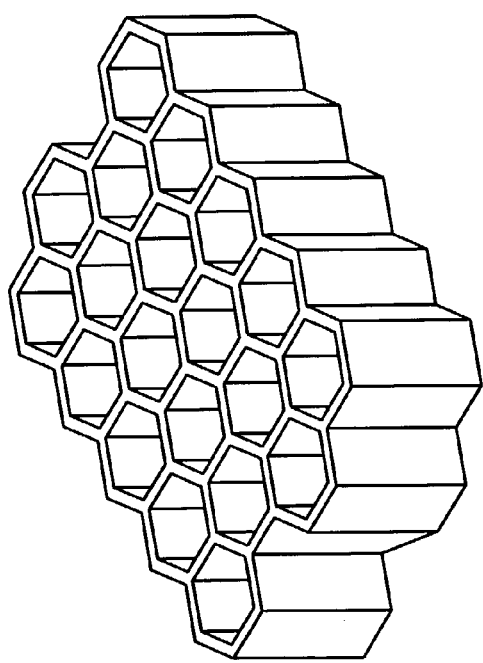

FIGS. 5–7 illustrate a top plan view of exemplary embodiments of the structured electrodes 26 implemented in the solar cell array 44, in accordance with the present techniques. In one exemplary embodiment the three layer membrane comprising the conductive material sandwiched between the two insulators is hollowed to create a hexagonal structured electrode array 46, as illustrated in FIG. 5. Alternatively, a rectangular channel structured electrode array 48 may be formed, as illustrated in FIG. 6. In another alternate embodiment a square or rectangular structured electrode array 50 may be implemented, as illustrated in FIG. 7. As can be appreciated, other structured electrode designs, including hollowed cylinders or other geometric shapes may also be fabricated and disposed in arrays of various geometries. Randomly configured cells may also be implemented. One technique for forming the randomly configured cells is by neutron bombardment, as can be appreciated by those skilled in the art. The diameter of each of the individual structured electrodes in the embodiments illustrated in FIGS. 5–7 may be in the range of approximately 1–10 microns, for example, as previously described.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A solar cell comprising:
   a first planar electrode comprising a transparent material;
   a second planar electrode proximately positioned at a distance from the first planar electrode;
   a structured electrode proximately positioned between and electrically isolated from each of the first planar electrode and the second planar electrode, and wherein the structured electrode is configured to provide a cavity;
   a porous dye sensitized semiconductor material positioned within the cavity of the structured electrode; and
   an electrolyte solution positioned within the cavity of the structured electrode.

2. The solar cell, as set forth in claim 1, wherein the first planar electrode comprises one of plastic and glass.

3. The solar cell, as set forth in claim 1, wherein the first planar electrode comprises a transparent conducting oxide layer.

4. The solar cell, as set forth in claim 3, wherein the transparent conducting oxide layer is platinized.

5. The solar cell, as set forth in claim 1, wherein the second planar electrode comprises metal.

6. The solar cell, as set forth in claim 1, wherein the second planar electrode comprises a transparent conducting oxide layer.

7. The solar cell, as set forth in claim 1, wherein the second planar electrode is platinized.

8. The solar cell, as set forth in claim 1, wherein the first planar electrode is parallel to the second planar electrode.

9. The solar cell, as set forth in claim 1, wherein the second planar electrode is proximately positioned at a distance in the range of approximately 1–50 microns from the first planar electrode.

10. The solar cell, as set forth in claim 1, wherein the structured electrode comprises a conducting material.

11. The solar cell, as set forth in claim 1, wherein the structured electrode comprises a metal.

12. The solar cell, as set forth in claim 1, wherein the structured electrode comprises a transparent conducting oxide.

13. The solar cell, as set forth in claim 1, wherein the structured electrode comprises a platinized material.

14. The solar cell, as set forth in claim 1, wherein the structured electrode comprises a carbonized material.

15. The solar cell, as set forth in claim 1, wherein the structured electrode extends in a direction approximately perpendicular to each of the first planar electrode and the second planar electrode.

16. The solar cell, as set forth in claim 1, wherein the height of the structured electrode is in the range of approximately 1–50 microns.

17. The solar cell, as set forth in claim 1, wherein the structured electrode has a diameter in the range of approximately 1–10 microns.

18. The solar cell, as set forth in claim 1, wherein the cavity has a diameter in the range of approximately 1–10 microns.

19. The solar cell, as set forth in claim 1, wherein the dye sensitized semiconductor material comprises a titanium oxide ($TiO_2$).

20. The solar cell, as set forth in claim 1, wherein the dye sensitized semiconductor material comprises a porous material having a plurality of nanocrystals.

21. The solar cell, as set forth in claim 20, wherein each of the plurality of nanocrystals have a diameter in the range of approximately 10–400 nanometers.

22. The solar cell, as set forth in claim 1, wherein the electrolyte solution comprises one of an organic solvent and an ionic liquid.

23. The solar cell, as set forth in claim 1, wherein the electrolyte solution comprises one of iodide and an iodide/triiodide couple.

24. The solar cell, as set forth in claim 1, wherein the solar cell comprises:
a first insulative material coupled between the first planar electrode and the structured electrode; and
a second insulative material coupled between the second planar electrode and the structured electrode,
wherein each of the first insulative material and the second insulative material comprises a cavity coincident with the cavity of the structured electrode.

25. The solar cell, as set forth in claim 24, wherein the first insulative material has a height in the range of approximately 0.5–2.0 microns.

26. The solar cell, as set forth in claim 24, wherein the second insulative material has a height in the range of approximately 0.5–2.0 microns.

27. The solar cell, as set forth in claim 1, wherein the cross-sectional shape of the structured electrode comprises a hexagon.

28. The solar cell, as set forth in claim 1, wherein the cross-sectional shape of the cavity comprises a hexagon.

29. A solar cell comprising:
a first planar electrode comprising a transparent material;
a second planar electrode proximately positioned at a distance from the first planar electrode;
a structured electrode proximately positioned between and electrically isolated from each of the first planar electrode and the second planar electrode, and wherein the structured electrode is configured to provide a cavity defined by an inner surface of the structured electrode;
a dye sensitized semiconductor material positioned within the cavity of the structured electrode, wherein the dye sensitized semiconductor material is electrically isolated from each of the first planar electrode and the second planar electrode; and
an electrolyte solution positioned within the cavity of the structured electrode.

30. The solar cell, as set forth in claim 29, wherein the dye sensitized semiconductor material is electrically coupled to the inner surface area of the structured electrode and wherein the dye sensitized semiconductor material contacts a majority of the inner surface of the structured electrode.

31. The solar cell, as set forth in claim 29, comprising one of inert beads or a porous insulator positioned between the dye sensitized semiconductor material and the second planar electrode.

32. The solar cell, as set forth in claim 29, wherein the dye sensitized semiconductor material comprises a porous material having a plurality of nanocrystals.

33. The solar cell, as set forth in claim 29, wherein each of the plurality of nanocrystals has a diameter in the range of approximately 10–400 nanometers.

34. The solar cell, as set forth in claim 32, wherein the longest distance from any of the plurality of nanocrystals to the nearest point of the inner surface of the structured electrode is in the range of approximately 0.5–5 microns.

35. The solar cell, as set forth in claim 29, wherein the first planar electrode comprises a transparent conducting oxide layer.

36. The solar cell, as set forth in claim 35, wherein the transparent conducting oxide layer is platinized.

37. The solar cell, as set forth in claim 29, wherein the second planar electrode comprises a platinized electrode.

38. The solar cell, as set forth in claim 29, wherein the second planar electrode is proximately positioned at a distance in the range of approximately 1–50 microns from the first planar electrode.

39. The solar cell, as set forth in claim 29, wherein the structured electrode comprises a conducting material.

40. The solar cell, as set forth in claim 29, wherein the electrolyte solution comprises one of an organic solvent and an ionic liquid.

41. The solar cell, as set forth in claim 29, wherein the electrolyte solution comprises one of an iodide and an iodide/triiodide couple.

42. The solar cell, as set forth in claim 29, wherein the solar cell comprises:
a first insulative material positioned between the first planar electrode and the structured electrode; and
a second insulative material positioned between the second planar electrode and the structured electrode,
wherein each of the first insulative material and the second insulative material comprises a cavity coincident with the cavity of the structured electrode.

43. The solar cell, as set forth in claim 29, wherein the cross-sectional shape of the structured electrode comprises a hexagon.

44. The solar cell, as set forth in claim 29, wherein the cross-sectional shape of the cavity comprises a hexagon.

45. A solar cell comprising:
a first planar electrode comprising a transparent material;
a second planar electrode proximately positioned at a distance from the first planar electrode;
a structured electrode proximately positioned between and electrically isolated from each of the first planar electrode and the second planar electrode, and wherein the structured electrode is configured to provide a cavity defined by an inner surface of the structured electrode;
a dye sensitized semiconductor material positioned within the cavity of the structured electrode, wherein the dye sensitized semiconductor material is electrically coupled to each of the first planar electrode and the second planar electrode and wherein the dye sensitized semiconductor material contacts less than one quarter of the inner surface of the structured electrode; and
an electrolyte solution positioned within the cavity of the structured electrode.

46. The solar cell, as set forth in claim 45, wherein the dye sensitized semiconductor material comprises a porous material having a plurality of nanocrystals.

47. The solar cell, as set forth in claim 46, wherein each of the plurality of nanocrystals has a diameter in the range of approximately 10–400 nanometers.

48. The solar cell, as set forth in claim 46, wherein the longest distance from any of the plurality of nanocrystals to the nearest point of the inner surface of the structured electrode is in the range of approximately 0.5–5 microns.

49. The solar cell, as set forth in claim 45, wherein the first planar electrode comprises a transparent conducting oxide layer.

50. The solar cell, as set forth in claim 45, wherein the second planar electrode comprises a metal electrode.

51. The solar cell, as set forth in claim 45, wherein the second planar electrode is proximately positioned at a distance in the range of approximately 1–50 microns from the first planar electrode.

52. The solar cell, as set forth in claim 45, wherein the structured electrode comprises a platinized conducting material.

53. The solar cell, as set forth in claim 45, wherein the electrolyte solution comprises one of an organic solvent and an ionic liquid.

54. The solar cell, as set forth in claim 45, wherein the electrolyte solution comprises one of iodide and an iodide/triodide couple.

55. The solar cell, as set forth in claim 45, wherein the solar cell comprises:
a first insulative material positioned between the first planar electrode and the structured electrode; and
a second insulative material positioned between the second planar electrode and the structured electrode,
wherein each of the first insulative material and the second insulative material comprises a cavity coincident with the cavity of the structured electrode.

56. The solar cell, as set forth in claim 45, wherein the cross-sectional shape of the structured electrode comprises a hexagon.

57. The solar cell, as set forth in claim 45, wherein the cross-sectional shape of the cavity comprises a hexagon.

* * * * *